(12) United States Patent
Yin

(10) Patent No.: US 10,928,681 B2
(45) Date of Patent: Feb. 23, 2021

(54) INTELLIGENT LIGHT ALIGNMENT DRIVING SYSTEM AND DRIVING METHOD THEREOF

(71) Applicant: Shenzhen China Star Optoelectronics Semiconductor Display Technology Co., Ltd., Shenzhen (CN)

(72) Inventor: Chonghui Yin, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 734 days.

(21) Appl. No.: 15/735,608

(22) PCT Filed: Nov. 27, 2017

(86) PCT No.: PCT/CN2017/113052
§ 371 (c)(1),
(2) Date: Dec. 12, 2017

(87) PCT Pub. No.: WO2019/052013
PCT Pub. Date: Mar. 21, 2019

(65) Prior Publication Data
US 2019/0086735 A1 Mar. 21, 2019

(30) Foreign Application Priority Data
Sep. 15, 2017 (CN) .......................... 201710835568.9

(51) Int. Cl.
*G02F 1/1337* (2006.01)
*G02F 1/1343* (2006.01)
(Continued)

(52) U.S. Cl.
CPC ...... *G02F 1/133711* (2013.01); *G02F 1/1303* (2013.01); *G02F 1/1343* (2013.01); *H02J 4/00* (2013.01); *G02F 1/133788* (2013.01)

(58) Field of Classification Search
CPC .. G02F 1/1303; G02F 11/133; G02F 1/13306; G02F 1/1333; G02F 1/133711; G02F 1/133788; G02F 1/1343; H02J 4/00
See application file for complete search history.

(56) References Cited

U.S. PATENT DOCUMENTS

2018/0267342 A1* 9/2018 Morita ................ G02F 1/13306

FOREIGN PATENT DOCUMENTS

| CN | 201557088 U | 8/2010 |
|---|---|---|
| CN | 101925222 A | 12/2010 |

(Continued)

*Primary Examiner* — Matthew V Nguyen
(74) *Attorney, Agent, or Firm* — Leong C. Lei

(57) ABSTRACT

The invention provides an intelligent light alignment driving system and driving method thereof. The system comprises, connected in series: mains electricity supply modules, voltage regulation system, UPS/PC module, phase shifter, APS module, automatic jumper system, and probe bar. The probe bar connects a panel pad of panel to the output of automatic jumper system. The voltage regulation system transforms 380V to single-phase 220V and outputs stably. The phase shifter first attenuates the signal 100 times and then raises jointly 100 times. The invention also provides a corresponding driving method. The intelligent light alignment driving system and the driving method thereof improve the functions of the driving system, meet the requirements of new products/technologies, and realize automation to improve the production yield, reduce the production loss and reduce the occurrence probability of mistake operation events.

4 Claims, 5 Drawing Sheets

(51) Int. Cl.
*G02F 1/13* (2006.01)
*H02J 4/00* (2006.01)

(56) References Cited

FOREIGN PATENT DOCUMENTS

| | | | | |
|---|---|---|---|---|
| CN | 204616164 | * | 9/2015 | ............. H05B 37/02 |
| CN | 204906174 U | | 12/2015 | |
| CN | 106356984 A | | 1/2017 | |
| CN | 108650733 | * | 10/2018 | ............. H05B 33/08 |

* cited by examiner

Noisy initial electric signal    Smooth electric signal after regulation

Out-of-phase electric signals    same-phase electric signals

INTELLIGENT LIGHT ALIGNMENT DRIVING SYSTEM AND DRIVING METHOD THEREOF

BACKGROUND OF THE INVENTION

1. Field of the Invention

The present invention relates to the field of display, and in particular to an intelligent light alignment driving system and driving method thereof.

2. The Related Arts

For the current mainstream TFT-LCD display market, there are three types: a twisted nematic (TN) or super twisted nematic (STN) type, an in-plane switching (IPS) type, and a vertical alignment (VA) type, wherein the VA type LCD shows a higher contrast compared to the other types, and is widely applied to large-size display, such as TV. The high vertical alignment (HVA) mode is an important branch of the VA mode. The HVA-type liquid crystal display (LCD) panel uses the vertical electric field formed by the pixel electrodes on the array substrate side and the common electrodes on the color filter (CF) substrate side to control the rotation of the liquid crystal (LC) molecules in the LC layer when operating.

The LC light alignment technology refers to the condition wherein a voltage is applied to the LC panel, UV irradiation is used to cause the monomers in the LC to react, so that the LC molecules form a pre-tilt angle to achieve the LC alignment. The LC panel comprises a CF substrate, an LC layer and a thin film transistor (TFT) substrate. The CF substrate and the TFT substrate are respectively provided with indium tin oxide transparent electrode layers, and the polyimide films are disposed on the surface of the indium tin oxide transparent electrode layer. The LC layer between the CF substrate and the TFT substrate contains monomers. When the CF substrate and the TFT substrate of the LC panel are applied with a voltage and irradiated with UV light, the monomers in the LC layer will react to align the LC molecules in the LC layer with a predetermined tilt angle so as to achieve the purpose of LC alignment.

FIG. 1 shows a schematic view of the alignment theory of the HVA. By using alignment UV machine (UVM) to irradiate under the condition of applied voltage, the monomers 1 added to the LC 2 form polymers under UV irradiation so that LC 2 pre-tilt angle is formed on the surface of the PL alignment film to achieve LC 2 alignment.

During HVA alignment process, the reliability and the compatibility of the applied voltage is very important and affects the production quality. FIG. 2 shows a schematic view of the current voltage applying system, comprising: a mains electricity supply module 11, UPS/PC module 12, APS module 13, a probe bar 14, and a panel 15, connected in sequence. The mains electricity supply module 11 supplies the power from a public facility, which is the power used in the factory in general. The USP/PC module 12 is for controlling the APS module 13 to output, editing output waveform, communication with main equipment, and voltage maintenance. The APS module 13 is for providing stable output voltage, comprising AC/DC, and able to edit any output waveform. The probe bar 14 is for connecting to the panel pad of the panel 15 to the output end of the APS module 13, comprising signal lines, military-spec connectors, probe bar body, block, probe in, and so on.

With the development of LCD technology, the HVA driving system requirements are as follows. For multi-model glass (MMG) products, at least two sizes of panels are included on the same glass substrate, with both products typically having different power recipes during the first UV cure. Product requirements are as follows: 1. for MMG products, two types of power signals can be simultaneously input into the large glass substrate, so that the two products can be applied with the power simultaneously; 2. stable electrical signal, low noise. For the lead on-chip (LOC) packaging technique, the CF substrate is patterned using a laser, and for the black photo-spacer (BPS) product, there is only indium tin oxide (ITO) on the CF side and equipments for manufacturing CF ITO mark and 2D code is required; the product requirements are: 1. the ITO on the CF side covers the whole surface, when etching and curing the ITO by laser, the laser cutting line must be confirmed insulated on both sides so the need for a loop inspection system to detect laser cutting lines and measure open or short of the lines; 2. a line inspection system required for detecting probe pin contact conditions.

The LOC technology is characterized by the CF-curing technology developed to save on curing routing and to alleviate array PVD/CVD specifications for compactly formatted products. HVA curing, the gold (Au) balls are needed to introduce the signals from the CF side into the TFT side.

The main disadvantages of the current voltage-applying system include: incompatible with array curing method/CF curing method; inability to achieve multi-push-multi-curing method; inability to achieve automatic jumping line; poor stability for APS output voltage; inability to achieve automatic switch of long side and short side lines. In the current voltage-applying system, whitening of some products without the voltage-regulated system leads to yield loss; inability to achieve two signals synchronization, inability to perform curing on the MMG product or having quality issue of; the inability of the voltage-applying system to meet the demand of gate-driver on array (GOA) product on signals increase, and manual jumping line is required, prone to mistake operation (MO) incidents.

SUMMARY OF THE INVENTION

The object of the present invention is to provide an intelligent light alignment driving system, to meet demands from new technologies/products and the impact of the generational change.

Another object of the present invention is to provide a driving method for intelligent light alignment driving system, to meet demands from new technologies/products and the impact of the generational change.

To achieve the above object, the present invention provides an intelligent light alignment driving system, which comprises, connected in series: a mains electricity supply module, a voltage regulation system, an UPS/PC module, a phase shifter, an APS module, an automatic jumper system, and a probe bar.

According to a preferred embodiment, the voltage-regulation system transforms a 380V into a single-phase 220V and outputs stably.

According to a preferred embodiment, the voltage regulation system is a regulator.

According to a preferred embodiment, the phase shifter first attenuates a signal by 100 times, and then raises jointly by 100 times.

According to a preferred embodiment, the phase shift is a multi-channel power system stabilizer.

According to a preferred embodiment, the automatic jumper system is a static transfer switch.

According to a preferred embodiment, the APS module is an auxiliary power supply.

According to a preferred embodiment, the APS module comprises a plurality of auxiliary power supplies.

According to a preferred embodiment, the automatic jumper system is connected to 1-10 auxiliary power supplies.

According to a preferred embodiment, the probe bar is to connect a panel pad of a panel to an output end of the automatic jumper system.

The present invention also provides a driving method for the above intelligent light alignment, which comprises the steps of:

Step 10: the mains electricity supply module providing a mains electricity; Step 20: the voltage regulation system transforming a 380V into a single-phase 220V and outputting stably; Step 30: the UPS/AC module controlling output of the APS module through the phase shifter and editing output waveform; Step 40: the phase shifter first attenuating a signal by 100 times, and then raising jointly by 100 times; Step 50: the APS module providing stable voltage output; Step 60: the automatic jumper system selecting signals from the APS module for outputting; Step 70: the probe bar connecting a panel pad of a panel to an output end of the automatic jumper system.

The present invention provides an intelligent light alignment driving system, which comprises, connected in series: a mains electricity supply module, a voltage regulation system, an UPS/PC module, a phase shifter, an APS module, an automatic jumper system, and a probe bar;

wherein the voltage-regulation system transforming a 380V into a single-phase 220V and outputting stably;

wherein the voltage regulation system being a regulator;

wherein the phase shifter first attenuating a signal by 100 times, and then raising jointly by 100 times;

wherein the phase shift being a multi-channel power system stabilizer;

wherein the automatic jumper system being a static transfer switch.

In summary, the intelligent light alignment driving system and driving method thereof of the present invention perfects the functions of driving systems and meets the demands of the new technologies/products, realizes automation to improve yield and reduce yield loss as well as reduce mistake operations probability.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
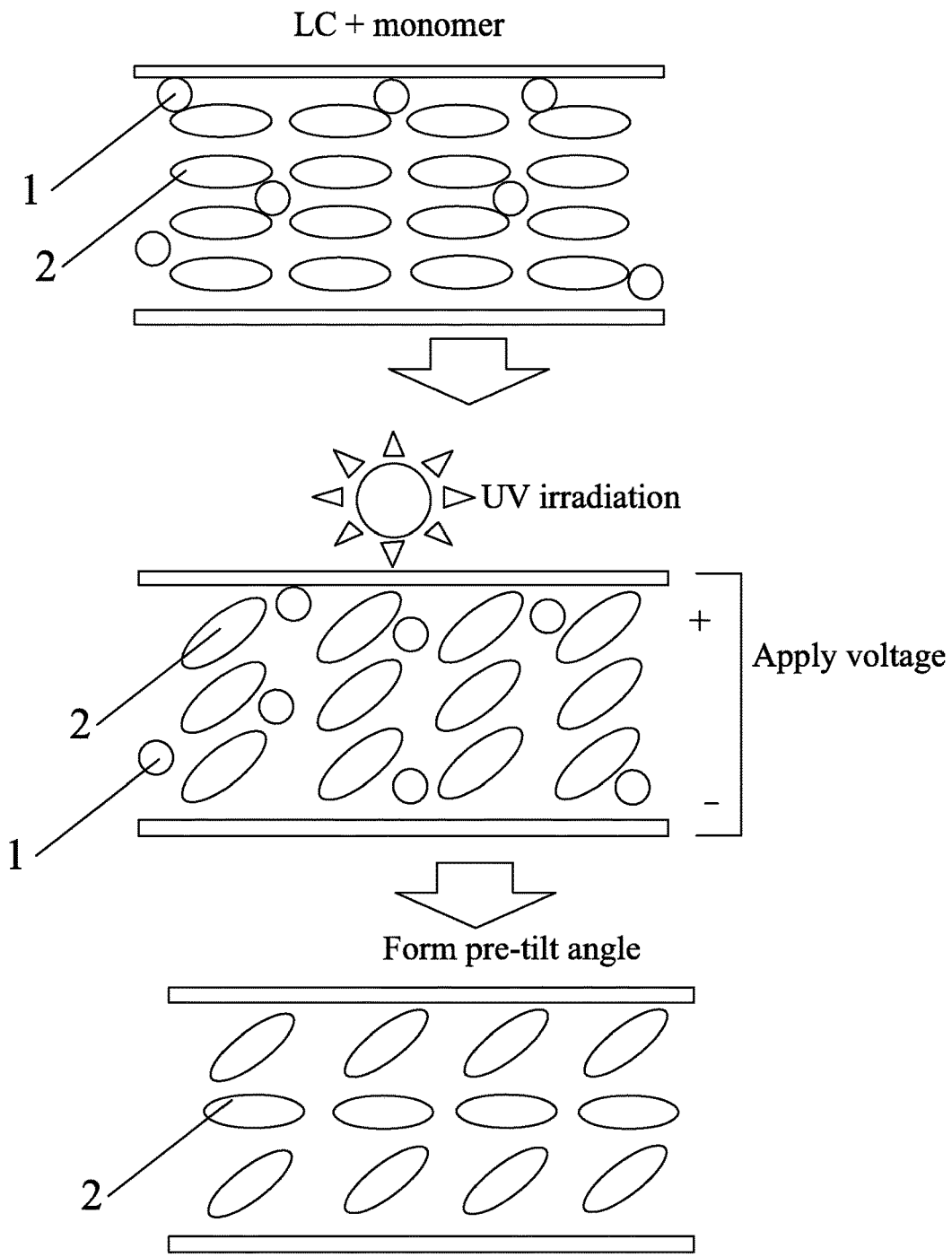
FIG. 1 is a schematic view showing the HVA alignment theory.
Figure 2:
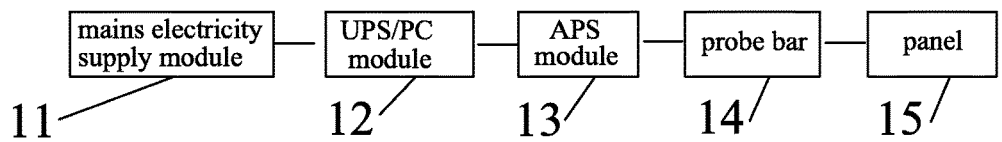
FIG. 2 is a schematic view showing a known voltage-applying system.
Figure 3:
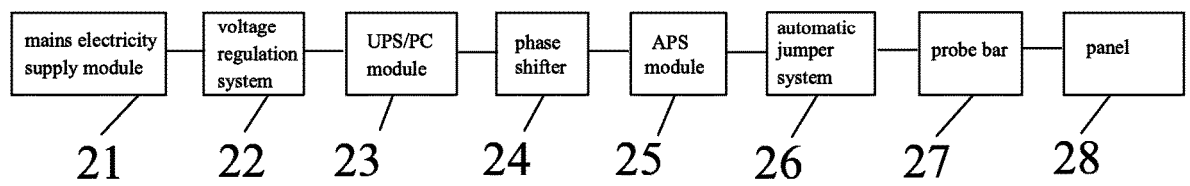
FIG. 3 is a schematic view showing an intelligent light alignment driving system provided by a preferred embodiment of the present invention.

Refer to FIG. 3. The present invention provides an intelligent light alignment driving system, which comprises, connected in series: a mains electricity supply module 21, a voltage regulation system 22, an UPS/PC module 23, a phase shifter 24, an APS module 25, an automatic jumper system 26, and a probe bar 27. Compared to the known system, the present invention adds the voltage regulation system 22, the phase shifter (comprising signal automatic allocation) 24, and the automatic jumper system 26. The remaining components are the same as the known system. The mains electricity module 21 provides a mains electricity, which is a power supply to the factory in general case; the UPS/PC module 23 is mainly for: controlling the APS module 25 to output through the phase shifter 24, editing output waveform, communication with main equipment, and voltage maintenance; the APS module 25 can be specifically an auxiliary power supply (APS), or comprises a plurality of APS, for providing stable output voltage, comprising AC/DC, and able to edit any output waveform; the probe bar 27 is for connecting to a panel pad of a panel 28 to the output end of the APS module 26, comprising signal lines, military-spec connectors, probe bar body, block, probe in, and so on.

The present invention provides the voltage regulation system 22 between the mains electricity supply module 21 and the UPS/PC module 23 to transform a 380V into a single-phase 220V and output stably, provides the phase shifter 24 between the UPS/PC module 23 and the APS module 25 to attenuate a signal by 100 times, and then raise jointly by 100 times, and provides the automatic jumper system 26 between the APS module 25 and the probe bar 27 to select the signals from the APS module 25 for outputting.

Figure 4:
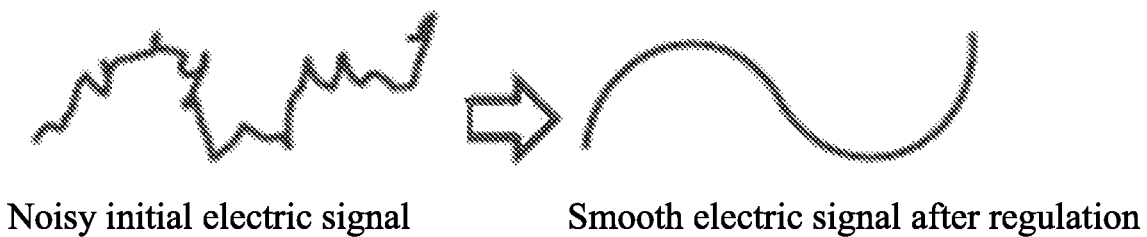
FIG. 4 is a schematic view showing the function of a voltage regulation system of an intelligent light alignment driving system provided by a preferred embodiment of the present invention.

Refer to FIG. 4, which is a schematic view showing the function of a voltage regulation system. Under the condition of a noisy initial electrical signal, the electrical signal is smoothed after being regulated by the voltage regulation system 22. The functions of the voltage regulation system 22 may include: converting 380V mains electricity into a single-phase 220V power supply; anti-noise signals (robot or other signals); stabilizing the output voltage (reducing the UPS mistake operation); in the first UV curing process, making the liquid crystals aligned with a uniform pre-tilt angle to reduce the uneven formation of the liquid crystal pre-tilt angle; reducing the leakage current (to prevent the power breaker from mistake operation, and cause an electric shock to operators).

The voltage regulation system can be specifically a regulator. To test the regulator effect, a multi-meter can be used to measure the input voltage and output voltage of the regulator for 10 times to observe the voltage fluctuations. Test results: after the voltage regulator, the output voltage can reach the required 220V, with the rate of change within 0.1%.

Figure 5:
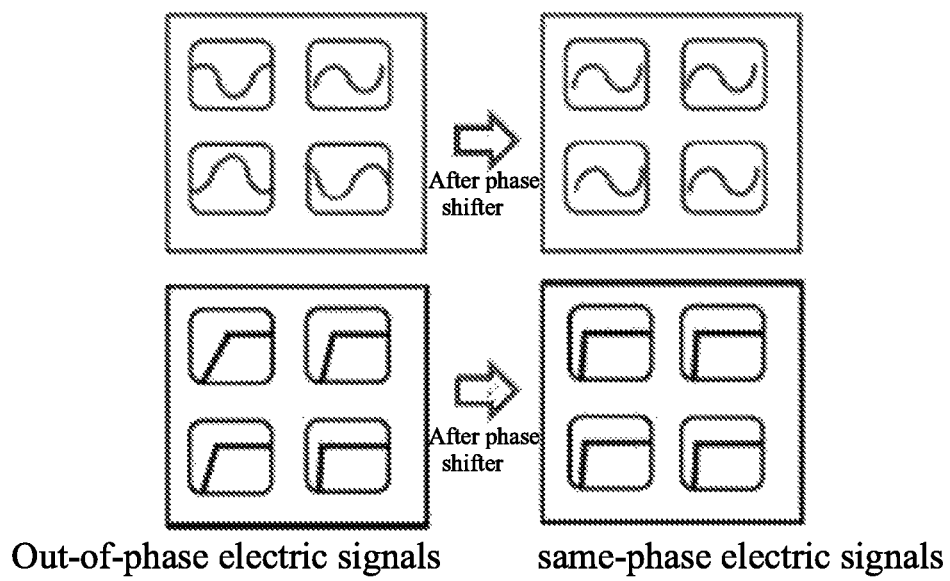
FIG. 5 is a schematic view showing the function of a phase shifter of an intelligent light alignment driving system provided by a preferred embodiment of the present invention.

Refer to FIG. 5, which is a schematic view showing the function of a phase shifter. The out-of-phase electric signals become same-phase electric signals after processed by the phase shifter 24. The functions of the phase shifter 24 comprises: first attenuating a signal by 100 times, and then raising jointly by 100 times; able to correspond to two or more driving manners; able to support MMG design; able to synchronize electric signals when supplied with two or three different electric signals. Specifically, the phase shifter can be a multi-channel power system stabilizer (MCPSS).

To test the effect of phase shifter, the test method can be: checking the phase difference of signals processed by the phase shifter and the phase difference of signals not processed by the phase shifter. Test results: after the phase shifter, the phase difference with the 20 Hz and 60 Hz is almost invisible to naked eye, and the phase difference for 500 Hz is less than 0.2 msec after amplification, which meets the specification. For unprocessed signals due to the start time difference of the power supply, the phase difference can reach half of the cycle.

Figure 6:
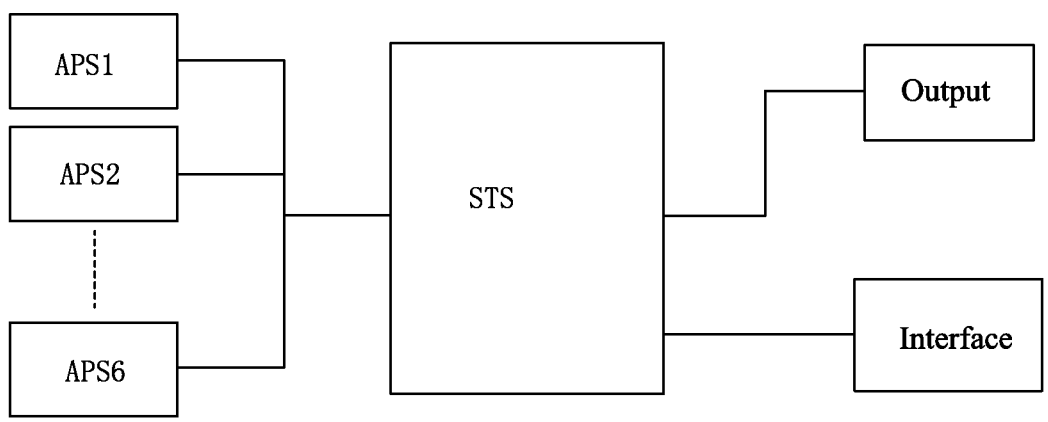
FIG. 6 is a schematic view showing the function of an automatic jumper system of an intelligent light alignment driving system provided by a preferred embodiment of the present invention.

Refer to FIG. 6, which is a schematic view showing the function of an automatic jumper system. In the preferred embodiment, the automatic jumper system 26 is a static transfer switch (STS), connected to a plurality of APS (APS1-APS6), outputted after controlled by the TST automatic jumping. The jumping of the STS can be pre-set by a default interface.

The functions of the automatic jumper system 26 comprise: connection to 1-10 auxiliary power supply; able to output APS individually, i.e., any one of the military-spec connector (such as, 12-pin) connected to the automatic jumper system 26 can be outputted; controllable by software for jumping. The automatic jumper system 26 can be connected to the known driving system and a new configuration interface can be added to the software of the known driving system.

Figure 7A:
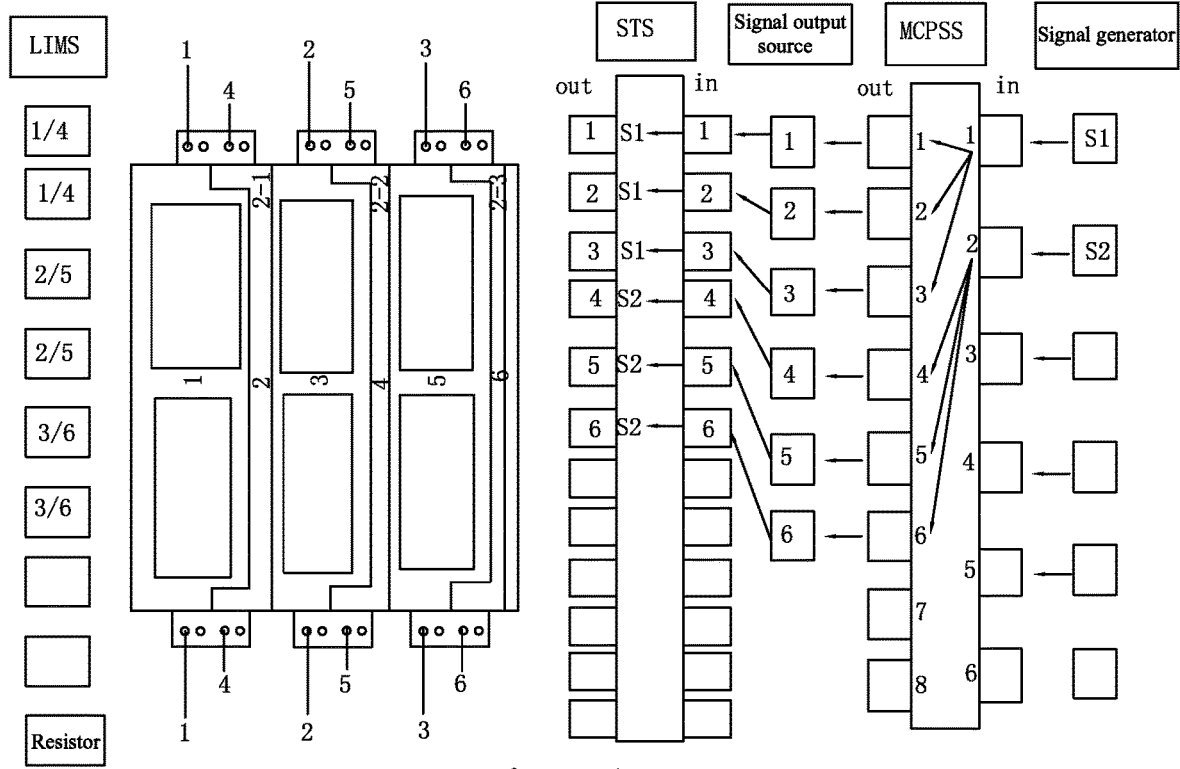
FIGS. 7A and 7B are schematic views showing the function of a phase shifter of an intelligent light alignment driving system provided by a preferred embodiment of the present invention when applied to different products of LOC technology.
Figure 7B:
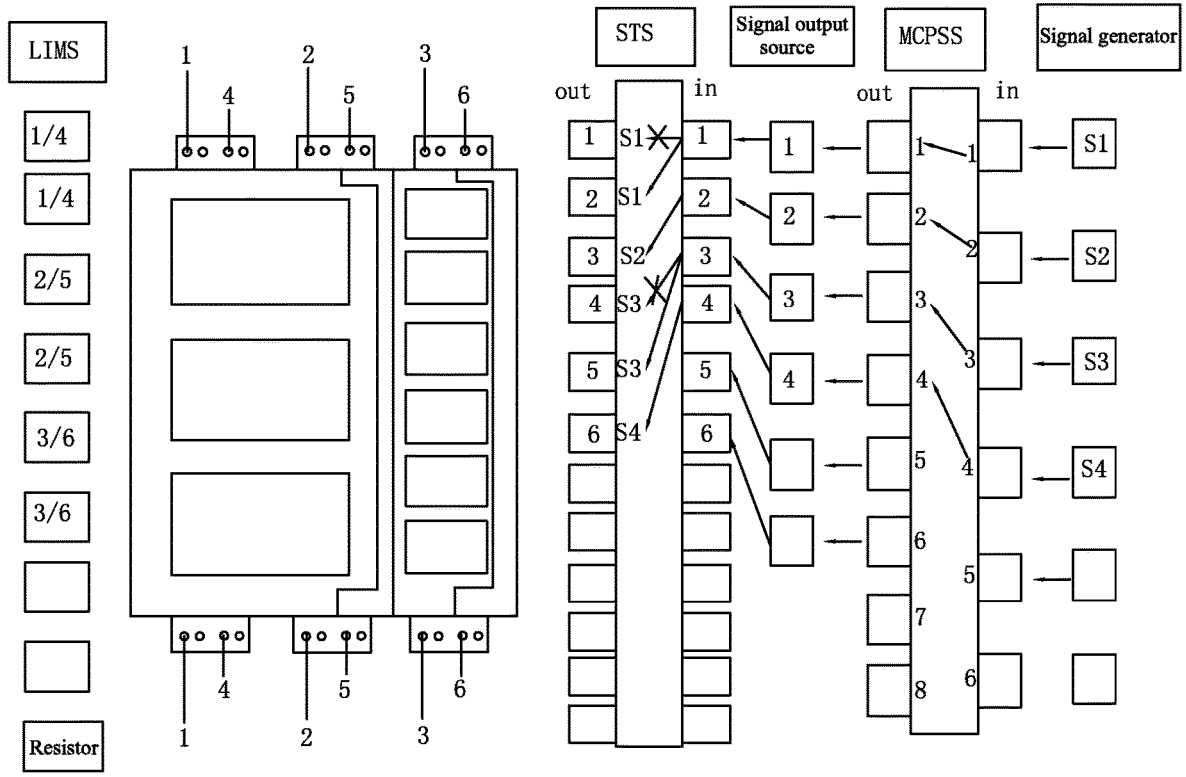

Refer to FIGS. 7A and 7B, which are are schematic views showing the function of a phase shifter of an intelligent light alignment driving system provided by a preferred embodiment of the present invention when applied to different products of LOC technology. In the preferred embodiment, the phase shifter is MCPSS, and the automatic jumper system is STS. Through the laboratory information management system (LIMS) to manage the jumping of the STS, the function of the MCPSS is depicted when different products can use different high/low voltage application solutions.

FIG. 7A shows a 55" (inch) product. A signal generator S1 controls the signal output source 1/2/3. The MCPSS can make the signal output from signal output source 1/2/3 having the synchronized phase to achieve uniform alignment of the LC in the panel. A signal generator S1 controls the signal output source 1/2/3, and a signal generator S2 controls the signal output source 4/5/6.

FIG. 7B shows 65"/32" (inch) products. The signal generator S1 controls the signal output source 1, the signal generator S2 controls the signal output source 2, the signal generator S3 controls the signal output source 3, and the signal generator S4 controls the signal output source 4. As such, the MCPSS enables the signal generators to control any signal output source to realize different signal output sources for different products without manual jumping.

Figure 8A:
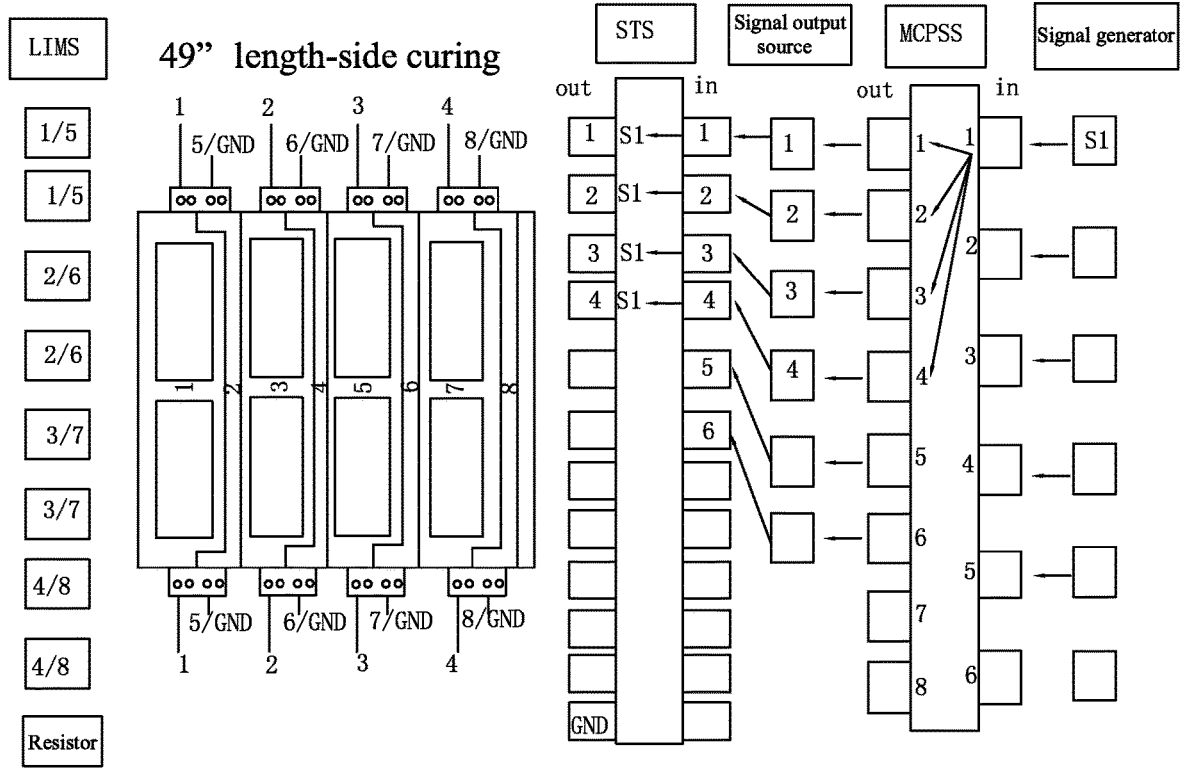
FIGS. 8A and 8B are schematic views showing the function of an automatic jumper system of an intelligent light alignment driving system provided by a preferred embodiment of the present invention when applied to different voltage application solutions of LOC technology.
Figure 8B:
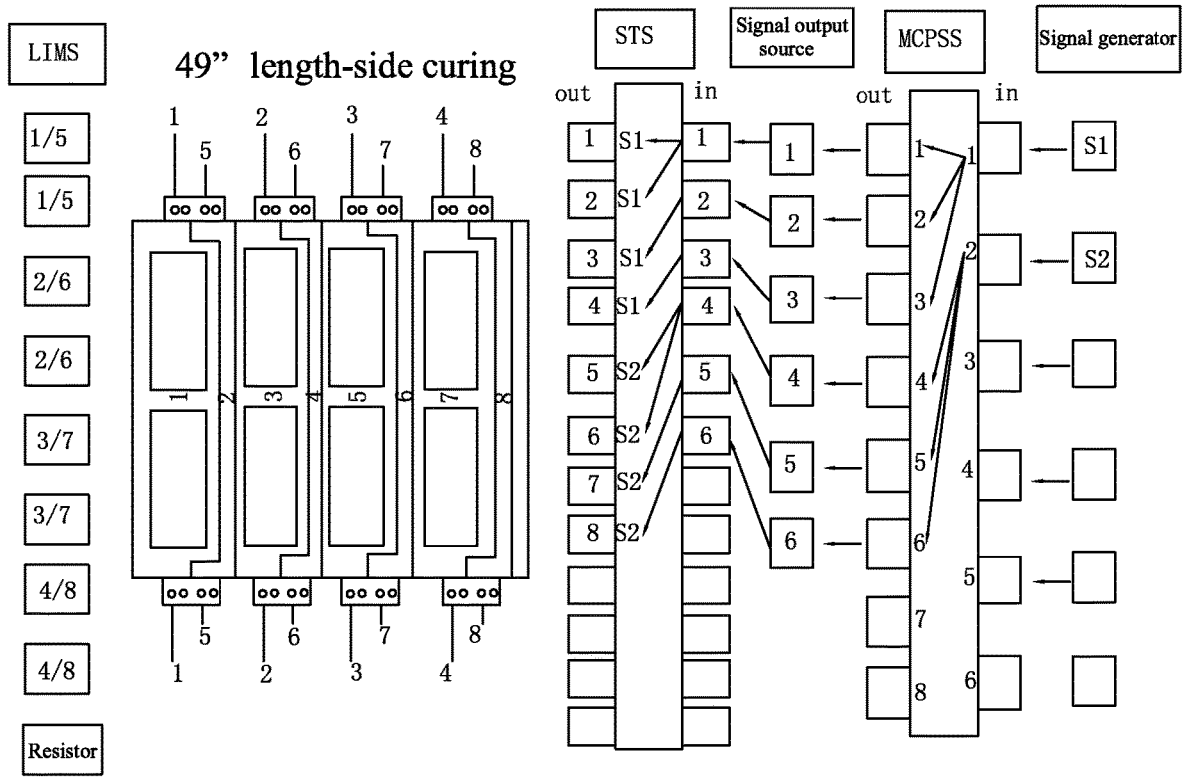

Refer to FIGS. 8A and 8B, which are schematic views showing the function of an automatic jumper system of an intelligent light alignment driving system provided by a preferred embodiment of the present invention when applied to different voltage application solutions of LOC technology. In the preferred embodiment, the phase shifter is MCPSS, and the automatic jumper system is STS. Through the laboratory information management system (LIMS) to manage the jumping of the STS, the function of the STS is depicted when the same products can use different high/low-high/ground (H/L-H/GND) voltage application solutions.

FIGS. 8A and 8B respectively correspond to two voltage application solutions schemes (H/GND-H/L) of a 49" product. FIG. 8A is switched to H/GND voltage application solution to cure. The output signal source corresponds to blocks 1-1, 2-2, 3-3, 4-4, blocks 1/2/3/4 all applied with high electrical signals; FIG. 8B is switched to H/L voltage application solution to cure. The output signal source corresponds to blocks 1-1/2, 2-3, 3-4, 4-5/6, 5-7, 6-; the STS can achieve the writing of signal output sources outputting different signals to different blocks in the panel without manual switching.

The intelligent light alignment driving system of the present invention can be directly configured and formed without additional modification cost when building a new factory. The invention solves the problems of generational and HVA process curing, such as, the inability to synchronize the signals, the poor stability of the curing voltage, and the inability to achieve automatic jumping, and so on. The present invention can achieve intelligent production, and avoid manual operations leading to mistake operation/cost loss.

The present invention also provides a driving method for the above intelligent light alignment, which comprises the steps of:

Step 10: the mains electricity supply module providing a mains electricity;

Step 20: the voltage regulation system transforming a 380V into a single-phase 220V and outputting stably;

Step 30: the UPS/AC module controlling output of the APS module through the phase shifter and editing output waveform;

Step 40: the phase shifter first attenuating a signal by 100 times, and then raising jointly by 100 times;

Step 50: the APS module providing stable voltage output;

Step 60: the automatic jumper system selecting signals from the APS module for outputting;

Step 70: the probe bar connecting a panel pad of a panel to an output end of the automatic jumper system.

In summary, the intelligent light alignment driving system and driving method thereof of the present invention perfects the functions of driving systems and meets the demands of the new technologies/products, realizes automation to improve yield and reduce yield loss as well as reduce mistake operations probability.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An intelligent light alignment driving system, which comprises, connected in series: a mains electricity supply module, a voltage regulation system, an uninterruptible power supply/power control (UPS/PC) module, a phase shifter, an auxiliary power supply (APS) module, an automatic jumper system, and a probe bar;

wherein the voltage-regulation system transforming a 380V into a single-phase 220V and outputting stably;
wherein the voltage regulation system being a regulator;
wherein the phase shifter first attenuating a signal by 100 times, and then raising jointly by 100 times;
wherein the phase shift being a multi-channel power system stabilizer;
wherein the automatic jumper system being a static transfer switch.

2. The intelligent light alignment driving system I as claimed in claim 1, wherein the APS module is an auxiliary power supply.

3. The intelligent light alignment driving system I as claimed in claim 2, wherein the APS module comprises a plurality of auxiliary power supplies.

4. The intelligent light alignment driving system I as claimed in claim 1, wherein the probe bar is to connect a panel pad of a panel to an output end of the automatic jumper system.

* * * * *